United States Patent [19]

Sandel

[11] Patent Number: 4,521,325
[45] Date of Patent: Jun. 4, 1985

[54] SELECTED N,1-DISUBSTITUTED HYDRAZINECARBOXAMIDES AND THEIR USE AS ANTIOXIDANTS

[75] Inventor: Bonnie B. Sandel, Milford, Conn.

[73] Assignee: Olin Corporation, Cheshire, Conn.

[21] Appl. No.: 560,721

[22] Filed: Dec. 12, 1983

[51] Int. Cl.$^3$ .................. C10M 1/32; C10L 1/22; C07C 133/02
[52] U.S. Cl. .................. 252/77; 252/51.5 R; 208/15; 208/16; 208/18; 564/34; 564/37; 564/149
[58] Field of Search ............. 252/51.5 R, 77; 208/15, 208/16, 18; 564/34, 37, 149

[56] References Cited

U.S. PATENT DOCUMENTS

| | | | |
|---|---|---|---|
| 1,906,044 | 4/1933 | Burk | 44/64 |
| 2,328,190 | 8/1943 | Burk et al. | 44/74 |
| 2,580,881 | 1/1952 | Biswell | 252/42.4 |
| 2,656,350 | 10/1953 | Ward et al. | 549/482 |
| 2,658,062 | 11/1953 | Jones | 564/34 |
| 2,729,690 | 1/1956 | Oldenburg | 260/799 |
| 3,489,684 | 1/1970 | O'Shea | 252/51.5 |
| 3,632,600 | 1/1972 | Morris | 260/383 |
| 3,699,053 | 10/1972 | Gentit | 252/77 |
| 3,773,722 | 11/1973 | Dexter | 260/45.75 |
| 3,888,840 | 6/1975 | Failli et al. | 564/149 |
| 3,984,463 | 10/1976 | Pilgram | 564/34 |
| 4,358,611 | 11/1982 | Pilgram | 564/34 |

FOREIGN PATENT DOCUMENTS 1521959 4/1968 France .

OTHER PUBLICATIONS

Vogelesang, "Methylated Semicarbazides", Rec. Trav. Chim. 62, 5–11 (1943), (CA 39:1393(8)).
Collard-Charon et al., "Infrared Spectra of Substances Having a C:Se Bond Adjacent to One or More Nitrogen Atoms II, Selenosemicarbazides," Bull. Soc. Chim. Belges 72, 291–303 (1963), (CA 59:8270g).
Zinner et al., "Carbamoylation of Hydrazine Derivatives", Arch. Pharm. (Weinheim, Ger.) 1973, 306(1), 35–44, (CA 78:97543a).

*Primary Examiner*—Paul Lieberman
*Assistant Examiner*—Robert A. Wax
*Attorney, Agent, or Firm*—Donald F. Clements; James B. Haglind

[57] ABSTRACT

Disclosed are selected N,1-disubstituted hydrazinecarboxamides having the formula

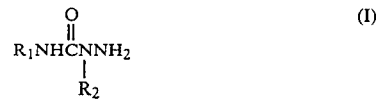

wherein $R_1$ is selected from the group consisting of alkyl containing from 1 to about 20 carbon atoms, aromatic containing from about 6 to about 12 carbon atoms, and cycloalkyl containing from about 5 to about 10 carbon atoms, and wherein $R_2$ is selected from the group consisting of alkyl containing from 1 to about 20 carbon atoms and hydroxyalkyl containing from 2 to about 20 carbon atoms. These compounds have utility as antioxidants for a variety of organic compounds subject to oxidative degradation, including functional fluids such as petroleum fuels and lubricants. Selected hydrazinecarboxamides having the aforesaid formula are also novel compounds.

21 Claims, No Drawings

SELECTED N,1-DISUBSTITUTED HYDRAZINECARBOXAMIDES AND THEIR USE AS ANTIOXIDANTS

BACKGROUND OF THE INVENTION

1. Field of the Invention

The present invention relates to selected N,1-disubstituted hydrazinecarboxamides and their use as antioxidants.

2. Brief Description of the Prior Art

Organic compositions containing olefinic and other linkages susceptible to oxidation will degrade when exposed to air. In the case of petroleum fuels such as gasoline, this autoxidation may lead to undesirable gum formation and to the formation of polar materials which may contribute to the corrosive properties of the fuel. Antioxidant chemicals may be added to these organic compositions to decrease the rate of this undesirable oxidative deterioration.

Numerous compounds have been disclosed as useful as antioxidants. For example, several classes of hydrazine derivatives have been described as antioxidants. U.S. Pat. No. 1,906,044 (issued to Burk on Apr. 25, 1933) teaches that semicarbazide, 4,4-disubstituted semicarbazides and certain aromatic hydrazines have an antigumming behavior in petroleum fuels. U.S. Pat. No. 2,328,190 (issued to Burk et al. on Aug. 31, 1943) teaches that certain thiocarbazides and thiosemicarbazides containing aryl substitutents act as antioxidants in fuels.

U.S. Pat. No. 2,580,881 (issued to Biswell on Jan. 1, 1952) teaches that certain salts of the 1-(ortho-hydroxyarylidene)-aminoguanidines are antioxidants.

Zinner et al, *Arch. Parm.*, Weinheim, Germany, 1973, 306(1), 35–44, disclose the reaction of methyl hydrazine with certain substituted isocyanates to yield certain disubstituted carbazides. However, no utility for these compounds is disclosed. U.S. Pat. No. 2,656,350 discloses the preparation of 5-nitro-2-furaldehyde 2-(2-hydroxyethyl)-4-methylsemicarbazone. No utility as an antioxidant is recognized.

There is a need for new antioxidants which have improved effectiveness in a wide variety of applications.

It is a primary object of this invention to provide improved antioxidant compositions.

It is a further object of this invention to provide certain novel hydrazinecarboxamide compositions useful as antioxidants.

Still another object of this invention is to provide a method of inhibiting the oxidative degradation of organic compounds.

These and other objects of the invention will be apparent from the following detailed description of the invention.

BRIEF SUMMARY OF THE INVENTION

The foregoing objects are accomplished in the present invention which is directed to antioxidant compositions comprised of N,1-disubstituted hydrazinecarboxamides having the formula (I):

wherein $R_1$ is selected from the group consisting of alkyl containing from 1 to about 20 carbon atoms, aromatic containing from 6 to about 12 carbon atoms, and a cycloalkyl containing from about 5 to about 10 carbon atoms, and wherein $R_2$ is selected from the group consisting of an alkyl containing from 1 to about 20 carbon atoms, and a hydroxyalkyl containing from 2 to about 20 carbon atoms. The present invention is also directed to the method of using these N,1-disubstituted hydrazinecarboxamides as antioxidants in organic compounds subject to oxidative degradation including functional fluids, such as petroleum fuels or lubricants.

In another embodiment of the invention, certain hydrazinecarboxamides within Formula I are novel. The novel compounds are those in which $R_1$ is an alkyl having from 1 to about 20 carbon atoms, aromatic containing from 6 to about 12 carbon atoms and cycloalkyl containing from about 5 to about 10 carbon atoms, and wherein $R_2$ is selected from the group consisting of an alkyl containing from 3 to about 20 carbon atoms and a hydroxyalkyl containing from 2 to about 20 carbon atoms and the total number of carbon atoms in $R_1$ and $R_2$ is at least 4.

DETAILED DESCRIPTION

The N,1-disubstituted hydrazinecarboxamides of the present invention are made by reacting a substituted isocyanate with a substituted hydrazine, preferably in the presence of an inert solvent. This reaction is illustrated by the following equation (A):

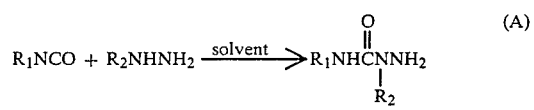

Suitable alkyl substituted isocyanate reactants for reaction A, where $R_1$ is alkyl having from 1 to 20 carbon atoms include lower alkyl isocyanates such as methyl isocyanate, ethyl isocyanate, isopropyl isocyanate, n-propyl isocyanate, isobutyl isocyanate, n-butyl isocyanate, and t-butyl isocyanate; higher alkyl isocyanates such as n-pentyl isocyanate, neopentyl isocyanate, hexyl isocyanate, octyl isocyanate, decyl isocyanate, dodecyl isocyanate, tetradecyl isocyanate, and octadecyl isocyanate and isomers thereof. Other suitable substituted isocyanates for reaction A, where $R_1$ is aromatic having from 6 to about 12 carbon atoms include phenyl isocyanate, p-methoxy phenol isocyanate, toluyl isocyanate, napthyl isocyanate, and the like. Suitable substituted isocyanates where $R_1$ is cycloalkyl having about 5 to about 10 carbon atoms include cycloalkyl isocyanates such as cyclopentyl isocyanate, cyclohexyl isocyanate, cycloheptyl isocyanate, cyclooctyl isocyanate, methylcyclopentyl isocyanate, methylcyclohexyl isocyanate, isomers thereof and the like.

Preferred alkyl-substituted isocyanate reactants include those where $R_1$ is a lower alkyl group having 1 to 4 carbon atoms.

Suitable substituted hydrazine reactants for reaction A, where $R_2$ is an alkyl having from 1 to about 20 carbon atoms include lower alkyl substituted hydrazine such as methyl hydrazine, ethyl hydrazine, propyl hydrazine, isobutyl hydrazine, n-butyl hydrazine, t-butyl hydrazine, n-pentyl hydrazine, neopentyl hydrazine, and higher alkyl-substituted hydrazines such as hexyl hydrazine, octyl hydrazine, decyl hydrazine, dodecyl hydrazine, tetradecyl hydrazine, octodecyl hydrazine and the like. Suitable substituted hydrazines where $R_2$ is a hydroxyalkyl having from 2 to about 20 carbon atoms include 2-hydroxyethyl hydrazine, 2-hydroxypropyl hydrazine, 2-hydroxybutyl hydrazine, and the like.

The preferred substituted hydrazines have as an $R_2$ substituent either an alkyl group containing from 3 to about 8 carbon atoms or a hydroxyalkyl group containing from 2 to about 6 carbon atoms. Alternatively the acid salt of the substituted hydrazine may be used as a reactant provided sufficient base is added to liberate the free substituted hydrazine.

Preferably, this reaction is carried out in the presence of inert organic solvents such as tetrahydrofuran, diethyl ether, petroleum ether, toluene, benzene, dioxane and mixtures thereof. The amount of solvent employed is not critical to the present invention and any conventional amounts may be used. For most reactions, the weight ratio of solvent to total reactants is preferably from about 5:1 to about 50:1.

Any conventional reaction conditions designed to produce N1-disubstituted hydrazinecarboxamides in accordance with Equation A may be employed in the synthesis of the antioxidant compounds of this invention. The present invention is not intended to be limited to any particular reaction conditions.

When preparing the compounds of this invention according to the reaction illustrated by Equation (A) in the presence of an inert solvent, the molar ratio of the substituted hydrazine to the substituted isocyanate is at least about 0.9:1 to ensure a desired yield of the resulting antioxidant product. Preferably, this mole ratio is in the range from about 1:1 to about 1.5:1.

Both the reaction temperature and time will depend upon many factors including the specific reactants and apparatus employed. In most situations, reaction temperatures from about 0° C. to about 100° C. may be employed. The reaction temperatures for the reaction illustrated by Equation (A) are preferably from about 15° C. to about 50° C. Reaction times may range from about 0.5 hour to about 24 hours. The reaction time will also depend upon the reaction temperatures chosen. The reaction pressure is preferably atmospheric; although subatmospheric (e.g., down to about 200 mm Hg) and superatmospheric (e.g., up to about 10 atmospheres) pressures may be useful in some situations. The desired products of the present invention may be removed from the reaction mixture by any suitable means, including evaporation of the solvent, filtration, extraction, recrystallization, distillation, or the like.

One specific preferred procedure for preparing the compounds of the present invention is to first prepare individual solutions of each reactant in the same solvent. The solution of the selected substituted isocyanate reactant is then preferably added to the solution containing the desired substituted hydrazine. The combined solutions are stirred with or without heating until the reaction is complete. The substituted hydrazinecarboxamide product may precipitate when a hydrocarbon or ether solvent (e.g. benzene, toluene, petroleum ethers or mixtures of these) are employed. The precipitated product is recovered by conventional techniques such as filtration or recrystallization or the like.

It should be noted that while the reaction illustrated by Equation (A) is the preferred method for preparing the compounds of the present invention, other methods of preparation may also be employed.

Also, in accordance with the present invention, the compounds of Formula I, above, may be utilized as effective oxidation inhibitors or anti-oxidants. In practicing the process of the present invention, an effective oxidation-inhibiting amount of one or more of these compounds is added to an organic composition subject to oxidation degradation such as a functional fluid, polyolefin plastics, or the like. It is understood that the term "effective oxidation-inhibiting amount" as used in the specification and claims herein is intended to include any amount that will prevent or control the oxidation of said organic composition. Of course, this amount may be constantly changing because of the possible variations in many parameters. Some of these parameters may include the specific base fluid to be protected; the salt and oxygen content of the system; the specific compound of the present invention used as an antioxidant; the geometry and capacity of the system to be protected; temperature; and the like.

The antioxidant compounds of this invention may be preferably used in concentrations ranging from about 0.0001% to about 10% by weight of the organic composition. More preferably, this concentration may range from about 0.005% to about 2% by weight of the organic composition. Functional fluids in which the antioxidant compounds of this invention may be added include hydrocarbon distillate fuels, hydrocarbon lubricant oils and greases, and non-hydrocarbon (i.e. synthetic oil base stocks) distillate fuels, lubricant oils and greases. The latter may include non-hydrocarbon compounds such as phosphate esters, carbonate esters, silicones, silicate esters, alkoxysilane cluster compounds, polyglycols, glycol esters and the like. The foregoing functional fluids may be used as fuels, lubricating oils, hydraulic fluids, brake fluids, heat transfer fluids, and the like. Polyolefins such as polyethylene, polypropylene, polybutadiene, and the like as well as styrenics such as polystyrene, ABS and IPS may also be inhibited against oxidative degradation with the anitoxidants of this invention.

One preferred class of functional fluids is liquid hydrocarbon fuels such as gasoline or diesel fuel. Another preferred class of functional fluids is hydrocarbon lubricants. For example, a liquid hydrocarbon fuel such as gasoline, or diesel fuel, and the hydrocarbon lubricant such as grease are mixed with an effective oxidation-inhibiting amount of one or more of the compounds of Formula (I) to inhibit oxidation of the functional fluid.

Various known inhibitors and additives may also be added with the antioxidant compounds of this invention to the organic composition such as functional fluids. These other additives and inhibitors further control or modify various chemical and physical properties of the functional fluids. The general term "inhibitor" is used for those additives which increase resistance to chemical changes. The ultimate function of an inhibitor is to maintain both the mechanical parts of the system and the fluid as close to their original conditions as possible.

Included among the various types of other additives which can be added to the functional fluids of this invention are: inhibitors for pH and corrosion control, other antioxidants, rust inhibitors, viscosity-index improvers, pour-point depressants, wear additives, lubricating additives, anti-foamants, metal deactivators, metal passivators, stabilizers, demulsifiers, dyes, and odor supressants. Generally, the total amount of other additives which may be incorporated into the fluid composition will vary depending on the particular composition and the desired properties. More particularly, the total amount of other additives will comprise from 0 to 20 percent and preferably from 0.1 to 8.0 percent by weight based on the total weight of the fluid composition.

The hydrazinecarboxamide antioxidants of this invention are effective at low concentrations, imparting to hydrocarbons greater color stability than previously known alkylated p-phenylenediamine antioxidants available commercially while still preventing gum formation. They are compatible with and impart oxidation stability to compositions containing alcohols, such as gasoline/ethanol, gasoline/t-butanol, or gasoline/methanol blends. In addition to being more hydrocarbon compatible than semicarbazide, the N,1-dialkylhydrazinecarboxamides of this invention are also more effective at preventing oxidative degradation.

The following Examples illustrate various embodiments of the present invention. All parts and percentages are by weight unless explicitly stated otherwise.

EXAMPLE 1

Preparation of
N-Butyl-1-(2-Hydroxyethyl)Hydrazinecarboxamide

To 7.61 g (0.1 moles) 2-hydroxyethylhydrazine in 150 mL tetrahydrofuran was added dropwise over a period of about ½ hour with stirring 9.91 g (0.1 mole) butylisocyanate in 50 mL tetrahydro-furan. At the end of the addition period stirring was continued until the solution cooled to room temperature. A small amount of precipitate was removed by filtration, and the solvent was evaporated to yield a viscous pale oil, N-butyl-1-(2-hydroxyethyl)hydrazinecarboxamide quantitatively. This structure was confirmed by NMR analysis.

EXAMPLE 2

Preparation of
N-Cyclohexyl-1-(2-Hydroxyethyl)Hydrazinecarboxamide

To a solution of 2-hydroxyethylhydrazine (7.15 g, 0.09 moles) in 125 mL tetrahydrofuran was added dropwise with stirring 11.76 g (0.09 moles) cyclohexyl isocyanate in 70 mL tetrahydrofuran. The solution was stirred overnight at room temperature, and the solvent was evaporated to yield quantitatively a pale viscous oil which slowly crystallizes.

Further purification of two portions of the product was effected either by recrystallization from 1:2 chloroform: petroleum ether or by treatment with 10% hydrochloric acid, filtration and treatment of the filtrate with saturated aqueous sodium carbonate, followed by extraction with methylene chloride. The methylene chloride layer was dried with MgSO4 and concentrated to yield upon treatment with petroleum ether N-cyclohexyl-1-(2-hydroxyethyl)hydrazinecarboxamide (m.p. 78°–79.5° C.). This structure was confirmed by NMR analysis.

EXAMPLE 3

Preparation of
N-Methyl-1-DodecylHydrazinecarboxamide

A stirred, degassed suspension of dodecylhydrazine hydrochloride (4.62 g, 0.017 mole) in diethyl ether (15 mL) was cooled under nitrogen and 4N aqueous potassium hydroxide (8.7 mL, 0.035 mole) was added. Stirring was continued as methyl isocyanate (0.97 g, 0.017 mole) in 5 mL diethyl ether was added dropwise. The mixture was filtered to yield 4.12 g (94.7%) N-methyl-1-dodecyl-hydrazinecarboxamide (m.p. 73°–75° C.). NMR analysis confirmed the structure.

EXAMPLE 4

Preparation of
N-Methyl-1-t-Butylhydrazinecarboxamide

A solution of 6.23 g t-butylhydrazine hydrochloride (0.050 moles) in 50 mL tetrahydrofuran was degassed, then stirred under nitrogen as, first, one equivalent of powdered potassium hydroxide and then, dropwise, 2.85 g methyl isocyanate in 25 mL tetrahydrofuran were added. The solution was stirred overnight. The mixture was filtered to remove the residual solid impurity which was washed several times with tetrahydrofuran. The combined filtrates were evaporated to yield a white product which was taken up in chloroform and dried. Removal of the solvent yielded 5.80 g (79.9%) white crystalline N-methyl-1-t-butylhydrazinecarboxamide (m.p. 127°–9° C.). This structure was confirmed by NMR analysis.

EXAMPLE 5

Preparation of
N-Methyl-1-Butylhydrazinecarboxamide

A suspension of 2.42 g n-butylhydrazine hydrochloride in 15 mL tetrahydrofuran was degassed and stirred under nitrogen with cooling (water bath) while 1.68 g of powdered potassium hydroxide was added. Stirring and cooling continued as 0.86 g (0.015 mole) methyl isocyanate in 15 mL tetrahydrofuran was added dropwise. The resulting mixture was allowed to stir at room temperature overnight. The solution was filtered and the filtrate evaporated to yield a colorless liquid. Vacuum distillation gave 82.7% N-methyl-1-butylhydrazine-carboxamide, b.p. 116°–118° C. at 0.06 torr. The compound crystallized upon standing m.p. 48°–50° C. Its structure was confirmed by NMR analysis.

EXAMPLE 6

Preparation of N,1-Dibutylhydrazinecarboxamide

To a cooled (water bath), stirred mixture of 2.42 g n-butylhydrazine hydrochloride in 15 mL tetrahydrofuran was added 1.7 g powdered potassium hydroxide. The resulting mixture was stirred and maintained under a nitrogen atmosphere as n-butyl isocyanate (1.49 g, 0.015 moles) in 30 mL tetrahydrofuran was added dropwise. After addition, the solution was stirred overnight at ambient temperature. Work up as in Example 5 above yielded 1.5 g N,1-dibutylhydrazinecarboxamide b.p. 135°–6° C. at 0.08 torr, m.p. 34°–36° C. This structure was confirmed by NMR analysis.

EXAMPLES 7-13

Induction Period Measurement

Examples of the compounds prepared in Examples 1-6 were weighed and individually dissolved in heptane/ethanol solutions to prepare stock solutions. Aliquots of these solutions were then added to 40% by volume cyclohexene in heptane to provide test solutions having 5 or 10 mg/L concentration of the active compound.

Each test solution was heated under an oxygen atmosphere according to the standard procedures of ASTM D525. The bomb utilized for this measurement was modified for automatic data acquisition by being fitted with a pressure transducer. This transducer was connected to a microprocessor programmed for voltage-/time data acquisition. The induction period for each test solution was determined according to its definition in the standard Method ASTM D525.

Results are tabulated in Table I and show these compounds stabilize a hydrocarbon liquid significantly. In each case, the observed induction period is increased greatly over the unstabilized fluid, which indicates the improved stability of the hydrocarbons against oxidative degradation when the antioxidants of this invention are present.

TABLE I

Induction Period for Cyclohexene/Heptane Solutions

| Example | Compound Example | Concentration (mg/L) | Observed Induction Period (min) |
|---|---|---|---|
| Comparison A | none | 0 | 76.2 |
| 7 | 1 | 10.0 | 391 |
| 8 | 2 | 10.0 | 363 |
| 9 | 3 | 10.0 | 246 |
| 10 | 4 | 10.0 | 202 |
| 11 | 5 | 10.0 | 507 |
| 12 | 6 | 10.0 | 452 |
| 13 | 2 | 5.0 | 234 |

EXAMPLES 14-20

Measurement of Potential Residue

Individual solutions of the compounds made in Examples 1-7 were added to a hydrocarbon mixture containing 60% isooctane, 35% cyclohexene and 5% toluene to provide test solutions having concentrations of 5.00 or 10.00 mg/L of active compounds. The test solutions were heated under an oxygen atmosphere and evaporated in a stream of heated air according to the procedures of ASTM D873.

The amount of gum formed (in mg/100 mL) in the presence of these antioxidants is tabulated below. In all cases, the amount of gum formed is reduced significantly relative to the unstabilized base flu.id (Comparison B). In addition, the reduced amount of gum formation with these antioxidants is far superior to results determined with a known antioxidant, semicarbazide of U.S. Pat. No. 1,906,044 (Comparison C).

TABLE II

Total Gum From Isooctane/Cyclohexene/Toluene Solutions

| Example | Compound Example | Conc. mg/L | Total Gum (mg/100 mL) |
|---|---|---|---|
| Comparison B | none | 0 | 61. |
| 14 | Ex 1 | 10.0 | 0.1 |
| 15 | Ex 2 | 10.0 | 1.5 |
| 16 | Ex 3 | 10.0 | 1.7 |
| 17 | Ex 4 | 10.0 | 19.7 |
| 18 | Ex 5 | 10.0 | 1.8 |
| 19 | Ex 6 | 10.0 | 1.6 |
| 20 | Ex 2 | 5.0 | 2.2 |
| Comparison C | semicarbazide | 10.0 | 52.9 |

EXAMPLE 21

Preparation of N-Methyl-1-(2-Hydroxypropyl)Hydrazinecarboxamide

To 4.08 g 2-hydroxypropylhydrazine (0.055 mole) in 50 mL diethyl ether was added dropwise with stirring 3 mL methyl isocyanate (0.050 moles) in 15 mL ether. After addition was complete the solution was heated under reflux for 3 hours during which time 15 mL of tetrahydrofuran was added. The solution was evaporated to yield a white solid. This solid was extracted with hot benzene and hot tetrahydrofuran to yield 3.9 g white crystals. Upon recrystallization from benzene, the crystals had m.p. 99°-101° C. NMR ($^1$H) confirms the structure: (δ, ppm) 1.0 (d, 3H, C$\underline{H_3}$C); 3.95 (M, 1H, C$\underline{H}$OH); 3.35 (d, 2H, C$\underline{H_2}$); 2.58 (d, 3H, C$\underline{H_3}$NH); 4.30 (S, 2H, NH$_2$). When tested according to the procedure of Examples 7-13, this compound had an induction period time of 331 minutes. When tested according to the procedure of Examples 14-20, this compound had a total gum formation of 0.4 mg/100 mL.

What is claimed is:

1. A method for inhibiting the oxidation of functional fluids which comprises adding to said functional fluid an effective oxidation inhibiting amount of an N,1-disubstituted hydrazinecarboxamide having the formula

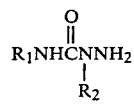

wherein R$_1$ is selected from the group consisting of an alkyl containing 1 to about 20 carbon atoms, an aromatic containing from about 6 to about 12 carbon atoms, and a cycloalkyl containing from about 5 to about 10 carbon atoms, and wherein R$_2$ is selected from the group consisting of an alkyl containing from 1 to about 20 carbon atoms and a hydroxyalkyl containing from 2 to about 20 carbon atoms.

2. The mthod of claim 1 wherein R$_1$ is an alkyl containing from 1 to 4 carbon atoms.

3. The method of claim 2 wherein R$_2$ is an alkyl containing from 3 to about 8 carbon atoms.

4. The method of claim 2 wherein R$_2$ is a hydroxyalkyl containing from 2 to about 6 carbon atoms.

5. The method of claim 1 wherein the effective oxidation inhibiting proportion is from about 0.0001 percent to about 10 percent by weight of the functional fluid.

6. The method of claim 1 wherein the effective oxidation inhibiting proportion is from about 0.005 percent to about 2 percent by weight of the functional fluid.

7. The method of claim 1 wherein said hydrazinecarboxamide is N-butyl-1-(2-hydroxyethyl)hydrazinecarboxamide.

8. The method of claim 1 wherein said hydrazinecarboxamide is N-cyclohexyl-1-(2-hydroxyethyl)-hydrazinecarboxamide.

9. The method of claim 1 wherein said hydrazinecarboxamide is N-methyl-1-dodecylhydrazinecarboxamide.

10. The method of claim 1 wherein said hydrazinecarboxamide is N-methyl-1-t-butylhydrazinecarboxamide.

11. The method of claim 1 wherein said hydrazinecarboxamide is N-methyl-1-butylhydrazinecarboxamide.

12. The method of claim 1 wherein said hydrazinecarboxamide is N,1-dibutylhydrazinecarboxamide.

13. An oxidation-inhibited functional fluid composition comprising a functional fluid containing an effective oxidation-inhibiting amount of an N,1-disubstituted hydrazinecarboxamide having the formula

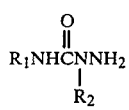

wherein $R_1$ is selected from the group consisting of an alkyl containing from 1 to about 20 carbon atoms, an aromatic containing from 6 to about 12 carbon atoms, and cycloalkyl containing from about 5 to about 10 carbon atoms, and wherein $R_2$ is selected from the group consisting of an alkyl containing from 1 to about 20 carbon atoms and a hydroxyalkyl containing from 2 to about 20 carbon atoms.

14. The functional fluid composition of claim 13 wherein said functional fluid comprises a hydrocarbon liquid.

15. The functional fluid composition of claim 14 wherein said functional fluid comprises a hydrocarbon lubricant.

16. The functional fluid composition of claim 14 wherein said functional fluid comprises a hydrocarbon fuel.

17. The functional fluid composition of claim 16 wherein said hydrocarbon fuel is gasoline.

18. The functional fluid composition of claim 16 wherein said hydrocarbon fuel is diesel fuel.

19. The functional fluid composition of claim 13 wherein $R_1$ is an alkyl containing from 1 to 4 carbon atoms.

20. The functional fluid composition of claim 19 wherein $R_2$ is an alkyl containing from 3 to about 8 carbon atoms.

21. The functional fluid composition of claim 19 wherein $R_2$ is a hydroxyalkyl containing 2 to about 6 carbon atoms.

* * * * *